United States Patent [19]

Da Silva Simoes

[11] Patent Number: 4,777,846

[45] Date of Patent: Oct. 18, 1988

[54] HYDROKINETIC ENERGY CONVERTER AND VELOCITY AND TORQUE MULTIPLIER

[76] Inventor: Adelino Da Silva Simões, Rua Gal. Andrade Neves 1025, Belo Horizonte, M.G., Brazil

[21] Appl. No.: 915,008

[22] PCT Filed: Jan. 10, 1986

[86] PCT No.: PCT/BR86/00001
§ 371 Date: Sep. 8, 1986
§ 102(e) Date: Sep. 8, 1986

[87] PCT Pub. No.: WO86/04027
PCT Pub. Date: Jul. 17, 1986

[30] Foreign Application Priority Data

Jan. 11, 1985 [BR] Brazil .................................. 8500143

[51] Int. Cl.$^4$ .............................................. F16H 47/06
[52] U.S. Cl. ........................................ 74/731; 74/126; 74/677
[58] Field of Search ................ 74/677, 687, 730, 731, 74/126, 128

[56] References Cited

U.S. PATENT DOCUMENTS

| 2,366,063 | 12/1944 | Seybold | 74/731 X |
|---|---|---|---|
| 2,449,905 | 9/1948 | Lotts et al. | 74/731 X |
| 2,613,772 | 10/1952 | Thurber | 74/731 X |
| 2,625,840 | 1/1953 | Sablette | 74/731 |
| 2,781,675 | 2/1957 | De Ford | 74/677 |
| 2,934,976 | 5/1960 | Herndon | 74/731 X |
| 2,939,340 | 6/1960 | Moore | 74/731 |
| 2,970,498 | 2/1961 | Murray et al. | 74/731 |
| 4,485,692 | 12/1984 | Moore et al. | 74/369 |

FOREIGN PATENT DOCUMENTS

| 2521410 | 11/1976 | Fed. Rep. of Germany . |
|---|---|---|
| 2602028 | 8/1977 | Fed. Rep. of Germany . |
| 604515 | 5/1926 | France . |
| 2118371 | 7/1972 | France . |
| 2508393 | 12/1982 | France . |
| 8505600 | 12/1985 | World Int. Prop. O. . |

Primary Examiner—Lawrence Staab
Assistant Examiner—Dwight G. Diehl
Attorney, Agent, or Firm—Beveridge, DeGrandi & Weilacher

[57] ABSTRACT

A hydrokinetic energy converter transforms the rotary output of a prime mover into hydrokinetic energy, which is blocked in an energy circuit including fluid coupled flywheels. The converter comprises a lighter flywheel mounted to rotate within and in fluid coupled relationship with a heavier flywheel. The shaft of the heavier flywheel is suitably connected to the prime mover. The shaft of the heavier flywheel is also coupled to the shaft of the lighter flywheel by a velocity multiplier.

12 Claims, 4 Drawing Sheets

HYDROKINETIC ENERGY CONVERTER AND VELOCITY AND TORQUE MULTIPLIER

The present invention refers to a hydrokinetic energy converter designed to transform the rotary output of a prime mover into continuous and progressively increasing hydrokinetic energy of which the progressive increase in energy may be used to drive a machine, vehicle or the like. The remaining energy may be "blocked" in a closed circuit of energy including two fluid coupled flywheels rotating at different angular velocities.

The invention likewise refers to a preferred form of velocity and torque multiplier which may form part of the energy converter mentioned above.

Attempts have previously been made to store part of the excessive energy of a drive motor in a flywheel from which the energy may be used as necessary instead of requiring additional energy from the motor. Considerable fuel economy may be obtained in a motor vehicle by storing energy in the flywheel when the vehicle is going downhill and then using part of such energy to assist the motor when the vehicle goes uphill.

The object of the present invention is to provide a greatly improved device using flywheels which permits not only even greater fuel economy but also creates great reserves of power with less engine wear and reduction in noise.

In accordance with the present invention a hydrokinetic energy converter comprises a first rotary shaft, a first heavier flywheel rotatable with said first shaft, a second lighter flywheel adapted to be fluid coupled with said first flywheel, a second rotary shaft rotatable with the second flywheel, a pressurized hydraulic fluid inlet in fluid communication with a space between said flywheel for providing the fluid coupling and a velocity multiplier coupling said first and second rotary shafts.

Preferably said first heavier flywheel is coaxial with and encloses therewithin the smaller second flywheel.

In one practical arrangement, a motor is connected to drive the first rotary shaft which rotates the first heavier flywheel at a given velocity. At the same time the motor is connected to the velocity multiplier whose increased velocity output drives the second shaft and thus the second lighter flywheel at an angular velocity greater than that of the first flywheel. When the latter has attained the given velocity, pressurised fluid supplied by a pump also driven by the motor is applied to the space between the flywheels to create the fluid coupling which tends to accelerate the first flywheel and decelerate the second. Power may then be taken from one of the shafts or even from the motor shaft itself to drive a load.

In accordance with the invention the velocity multiplier comprises a rotary input drive means, first and second velocity multiplier arrangements, each said arrangements comprising:

(a) first rotor means in driven relationship with said rotary input drive means:
(b) second rotor means coaxial with said first rotor means and having drives output means;
(c) rotary coupling means between said first and second rotor means, said coupling means having first follower means associated with said first rotor means and second follower means associated with said second rotor means, said coupling means being linearly reciprocable in a direction parallel to the common axis of said rotor means, and said second follower means being inclined with respect to said first follower means based on said direction of reciprocation, whereby reciprocation of said coupling means in a first direction drivingly rotates said second rotor means with respect to said first rotor means; and (d) free wheel means eliminating any driving relationship between said input drive means and said second rotor means during reciprocation of said coupling means in a second opposite direction, said free wheel means operating in opposite directions for the two said velocity multiplier arrangements; and transmission means between said rotary input drive means and each said coupling means, said transmission means converting rotary movement of said input drive means to linear reciprocation of each said coupling means. means is greater than the torque applied by said rotary input drive.

In the preferred embodiment of the velocity multiplier each first rotor means is a straight toothed gear, each second rotor means is a helical toothed gear and each coupling means comprises a reciprocating floating sleeve surrounding said gears in which each first follower means comprises at least one internal projection on the corresponding sleeve mating with a tooth space in the corresponding straight toothed gear and each second follower means comprises at least one internal projection on the same sleeve mating with a tooth space in the corresponding helical gear. The input drive means preferably comprise a pair of identical meshed gears and each said free wheel means is arranged between corresponding ones of said meshed gears and said straight toothed gears.

The transmission means suitably comprises a gear train including a differential gear set, arranged between one of said identical meshed gears and a connecting rod arrangement connected to reciprocate said floating sleeves.

It has been found in practice that in the case of the preferred embodiment a tooth angle of 30° should be chosen for the helical gears, provoked by friction, general mechanical losses, and slip in the hydraulic coupling between the flywheels.

In order to permit a better understanding of the invention, a preferred embodiment thereof will now be described, by way of example, with reference to the accompanying drawing, in which.

Figure 1:
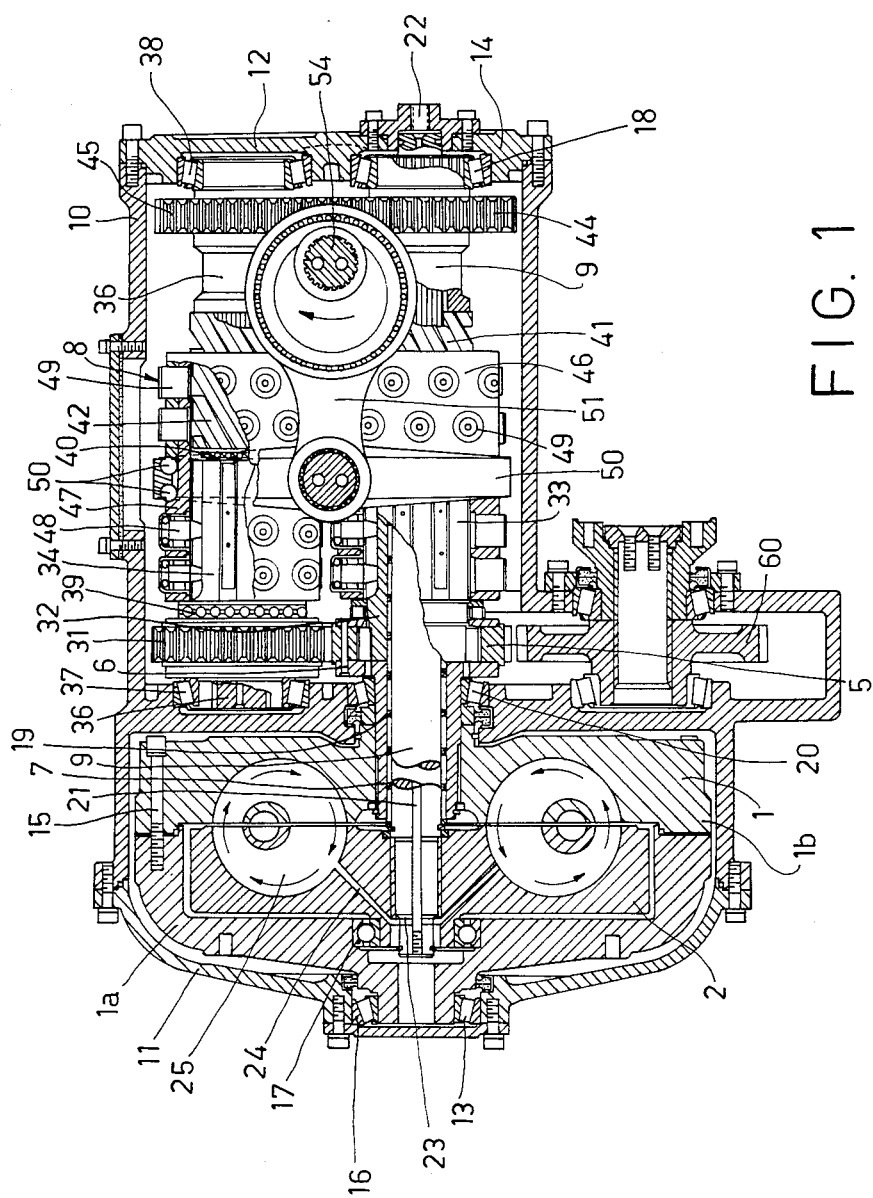
FIG. 1 is a longitudinal section along line I—I of FIG. 2, with some parts cut away and others not sectioned, of a hydrokinetic energy converter constructed in accordance with the present invention.
Figure 2:
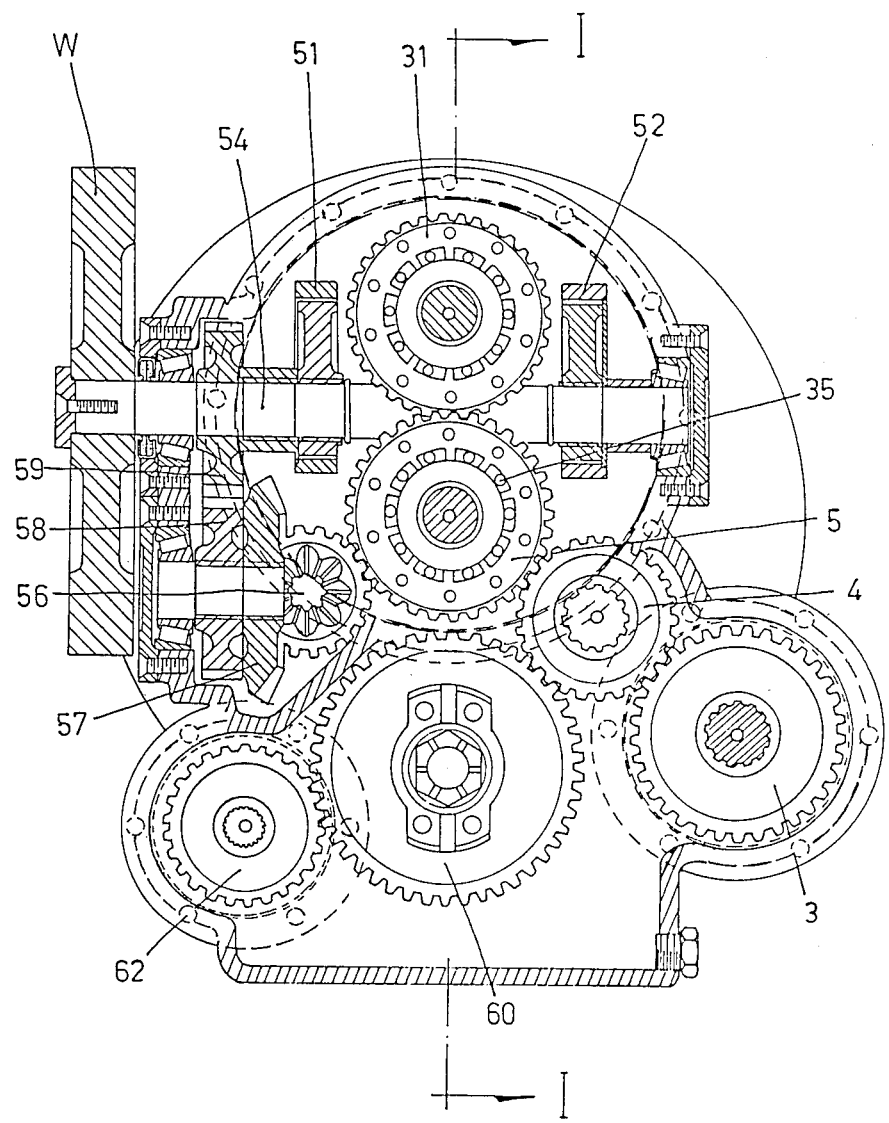
FIG. 2 is a cross section of the converter of FIG. 1 with some parts removed to facilitate comprehension.

Referring now to the drawings, an energy converter illustrated in FIGS. 1 and 2 comprises a pair of flywheels 1 and 2 of which the larger outer flywheel 1 is driven by a motor (not shown), gear wheels 3, 4 and 5 (FIG. 2), gear 5 being keyed by pins 6 to a sleeve 7 which, in its turn is keyed to flywheel 1.

Apart from serving to drive flywheel 1, gear 5 is part of a velocity multiplier generally indicated by reference number 8 and whose output is transmitted to a shaft 9 which passes through sleeve 7 and is keyed to the smaller inner flywheel 2.

In order to facilitate understanding of the illustrated energy converter, a simplified description of its operation will be given prior to describing the device in greater detail. On starting the drive motor, flywheel 1 is positively accelerated by means of gears 3, 4 and 5 and sleeve 7. At the same time the smaller flywheel 2 is positively driven at a greater velocity by means of the same motor, gears 3 and 4, velocity multiplier 8 and shaft 9. When the small flywheel 2 attains a given velocity a hydraulic pump driven by the same motor is permitted to pump oil under pressure to the space between flywheels 1 and 2 to define a fluid coupling therebetween. This fluid coupling completes a feedback of energy which is blocked or stored in the system, the torque transmitted by the coupling tending to accelerate flywheel 1 and slow down flywheel 2 which, however, is further accelerated due to the increased speed of flywheel 1 which is amplified by velocity multiplier 8 and then transmitted to flywheel 2. The output of the device may be taken from any suitable point in the system and may even be from the other end of the shaft of the motor that drives (or is driven by) gear 3.

Returning now to the device itself, the converter has a main housing 10 having bolted thereto end plates 11 and 12 with respective end caps 13 and 14 bolted thereto. Flywheel 1 is composed of two parts 1a and 1b bolted together by bolts 15 and defining therebetween a space which receives inner flywheel 2. Part 1a of flywheel 1 is journaled to housing 10 by means of conical bearing 16. Inner flywheel 2, in its turn, is journaled within part 1a of flywheel 1 by bearing 17 which also serves as one end bearing for its shaft 9 the other end of which is journaled in a conical bearing 18 mounted in the other end plate 12. Needle bearings 19 are also provided between shaft 9 and sleeve 7, this latter also rotating within conical bearing 20.

Shaft 9 is provided with an axial oil bore 21 in communication at one end with an oil inlet 22 provided in end cap 14 and, at the other end, via radial bores 23 and inclined bores 24 in flywheel 2 with the fluid coupling turbine space or pockets 25 between the two flywheels 1 and 2.

Figure 3:
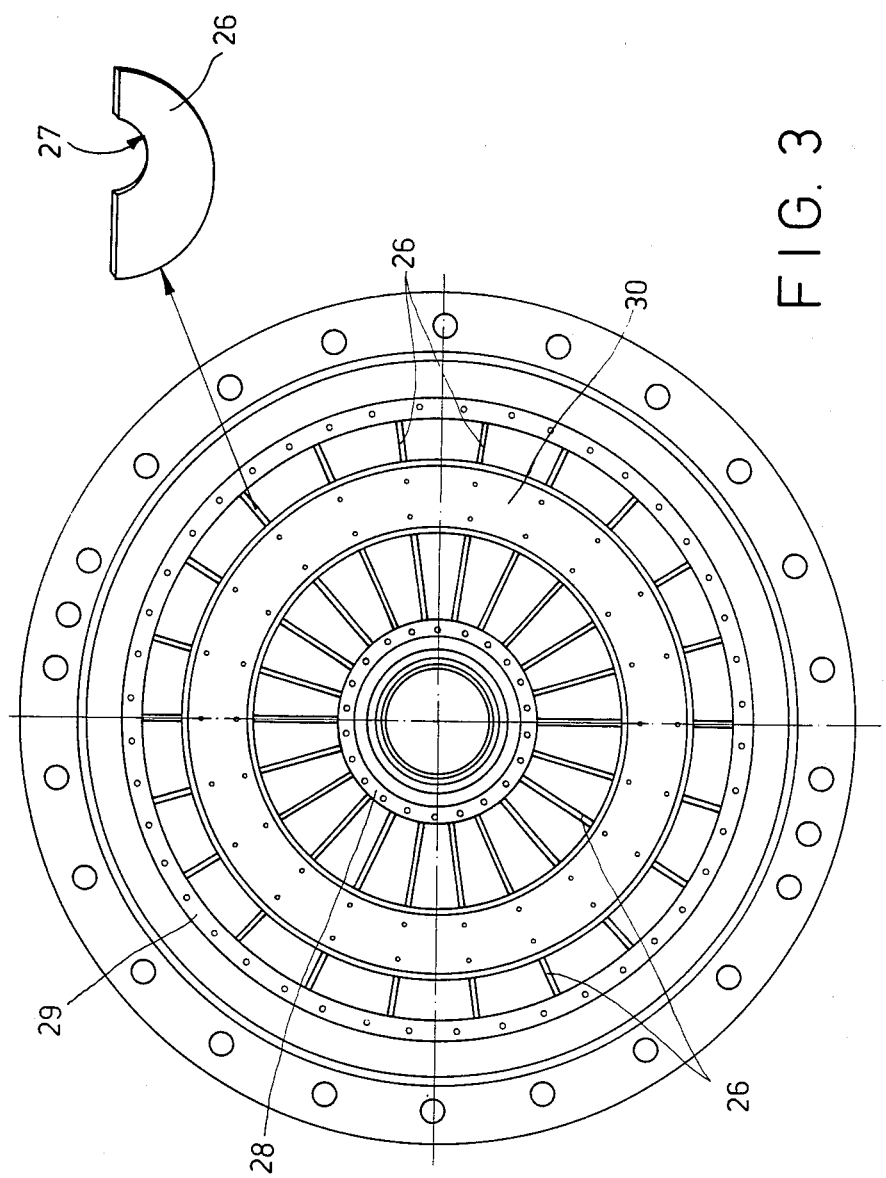
FIG. 3 is a view of the turbine face of one of the flywheels shown in FIG. 1.

FIG. 3 shows a view of one of the flywheel turbine faces (the turbine faces of the two flywheels are identical). As seen from FIG. 1, each flywheel is formed with a circular channel of semicircular cross section. As seen in FIG. 3, the channel of each flywheel is provided with twenty-three semi-circular equally angularly spaced radial oil deflector plates 26 each having a semi-circular cutout 27. These deflector plates are held in position by inner and outer metal rings 28 and 29 riveted to the turbine face of the flywheel. A circular channel 30 of semi-circular cross section is then fitted into cutouts 27 and riveted to the deflector plates 26. Flywheels 1 and 2 with turbine faces as shown in FIG. 3 have been found to provide an excellent fluid coupling therebetween.

The velocity multiplier 8 is shown partly in FIG. 1 and partly in FIG. 2. Gear 5 meshes with similar sized gear 31 so that they are driven in opposite directions by the drive motor (not shown). Internally of gears 5 and 31 are the stub ends 32 of straight toothed gears 33 and 34, the stub ends 32 being coupled to gears 5 and 31 for rotation in one direction but free for rotation in the opposite direction, these directions being different for the two gears, by means of a free wheel type arrangement employing roller pins 35 (see FIG. 2). Straight toothed gear 33 is freely supported on main shaft 9 by needle bearings 19 and gear 34 is likewise supported on a shaft 36 having one end mounted in housing 10 by means of a conical bearing 37 and its other end mounted in end plate 12 by means of a similar bearing 38. The left hand faces of gears 33 and 34 are separated from gears 5 and 31 by bearing rings 39 and the right hand faces thereof are separated by similar bearing rings 40 from helical gears 41 and 42. These helical gears, however are internally fluted and received on external fluting provided in the corresponding regions of shafts 9 and 36.

The right hand ends of shafts 9 and 36 carry meshing identical gears 44 and 45.

Each pair of associated straight toothed and helical gears 33, 41 and 34, 42 is surrounded by a reciprocating floating sleeve 46 or 47, sleeves 46 and 47 being identical whereby only sleeve 47 will be described. As may be seen from FIG. 1, sleeve 47 is provided with two groups of inwardly protecting studs. The first group of studs 48 comprises two rings of axially spaced studs whose ends enter the spaces between the straight teeth of gear 34. Consequently sleeve 47 will rotate together with gear 34 but may reciprocate axially. The second group of studs 49 comprises two rings of studs shifted with respect to each other at an angle corresponding to that of the teeth of helical gear 42.

It will be understood from the above description that reciprocation of sleeve 47 in one direction will rotate helical gear 42 at an angular velocity exceeding that of straight toothed gear 34 by an amount depending on the angle of the helical teeth but that reciprocation in the other direction will have no effect due to the free wheel arrangement 35 (see FIG. 2).

Due to the opposite directions of rotation of gears 5 and 31, reciprocation in such other direction will drive gear 41, whereas reciprocation in said one direction will have no effect.

Reciprocation of floating sleeves 46 and 47 is effected by a double collar 50 driven by a pair of connecting rods 51 and 52, only one of which is visible in FIG. 1. Double collar 50 is generally in the form of a figure of 8 so as completely to encircle each of sleeves 46 and 47. Coupling between said collar and each of said sleeves includes two arrays of ball bearings 50' so as to permit rotation of the sleeves relative to the collar but to permit the collar to transfer the axial reciprocating movement thereto. Rods 51 and 52 are driven by a toothed shaft 54 which is orthogonal to and passes between shafts 9 and 36. The drive arrangement is shown in FIG. 2 where it is seen that gear 5 also meshes with a small gear 55, integrally associated with a pinion 56 which drives a crown gear 57. Crown gear 57 is mounted on a shaft together with a gear 58 which in turn drives a gear 59 keyed to connecting rod shaft 54. A counterweight W is provided at the end of shaft 54 to provide dynamic balance in view of the eccentricity of the connecting rod arrangement.

Still with reference to FIG. 2, it will be seen that gear 4 also drives a gear 60 mounted on a shaft 61 which can be used as an output shaft. Gear 60, in its turn, meshes with gear 62 which may be used to drive the oil pump whose oil outlet will be connected to oil inlet 22 in housing end cap 14 (FIG. 1). The embodiment of the invention that has been described above has been constructed and tested in practice.

Figure 4:
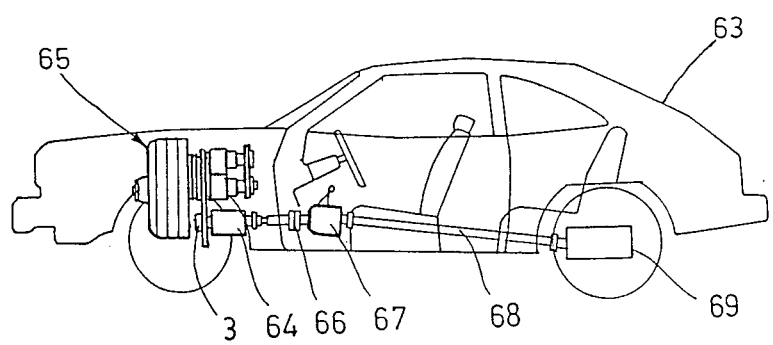
FIG. 4 is a sketch illustrating one application of the energy converter shown in FIGS. 1 to 3.

FIG. 4 is a sketch showing an application of the energy converter illustrated in FIGS. 1 to 3 to a motor car. Thus the car 63 has a 15 HP electric motor 64 whose output shaft has one end in driving relationship with gear 3 (FIG. 2) of the converter 65 and has its other end connected directly to the clutch 66 following which these may be a conventional gearbox 67, cardan shaft 68 and rear wheel drive transmission 69.

Although the invention has been described with respect to only one specific embodiment, it will be appreciated that many variations and alterations may be made provided that they do not go beyond the scope of the following claims.

I claim:

1. Hydrokinetic energy converter comprising a first roatry shaft, a first flywheel rotatable with said first rotary shaft, a second flywheel of a weight less than that of said first flywheel, said first and second flywheels being adapted to be in fluid coupled relationship, a second rotary shaft rotatable with said second flywheel, a pressurized hydraulic fluid inlet in fluid communication with a space between said first and second flywheels for providing said fluid coupled relationship, and a velocity multiplier coupling said first rotary shaft to said second rotary shaft, said velocity multiplier comprising a rotary input drive means coupled to said first rotary shaft, first and second velocity multiplier arrangements, each said arrangement comprising:
   (a) a straight toothed gear in driven relationship with said rotary input drive means;
   (b) a helical toothed gear coaxial with said straight toothed gear and having driven output means;
   (c) a reciprocating floating sleeve surrounding said gears, provided with at least one internal projection mating with a tooth space of said straight toothed gear and at least one other internal projection mating with a tooth space of said helical toothed gear, whereby reciprocation of said floating sleeve in a first direction drivingly rotates said helical toothed gear with respect to said straight toothed gear; and
   (d) free wheel means eliminating any driving relationship between said input drive means and said straight toothed gear during reciprocation of said floating sleeve in a second opposite direction, said free wheel means operating in opposite directions for the two said velocity multiplier arrangements; and
   transmission means between said rotary input drive means and said floating sleeve, said transmission means converting rotary movement of said input drive means to linear reciprocation of said floating sleeve.

2. Hydrokinetic energy converter according to claim 1 in which said second lighter flywheel is enclosed coaxially within said first flywheel and said first rotary shaft comprises a sleeve mounting said first flywheel and said second rotary shaft passes coaxially through said sleeve and has one end mounting said second flywheel.

3. Hydrokinetic energy converter according to claim 2 in which said fluid inlet is in connection with an axial bore along said second shaft said bore being in communication with fluid channels leading through said second flywheel to said space.

4. Hydrokinetic energy converter according to claim 1, in which said input drive means comprises a pair of identical meshed gears each associated with a respective one of said velocity multiplier arrangements and in that each said free wheel means is arranged between corresponding ones of said meshed gears and said straight toothed gears.

5. Hydrokinetic energy converter according to claim 4 in which said transmission means comprises a gear crown including a differential gear set arranged between one of said identical meshed gears and a connecting rod arrangement connected to reciprocate said floating sleeves.

6. Hydrokinetic energy converter according to claim 5, in which said connecting rod arrangement comprises a pair of parallel connecting rods mounted on a shaft on either side of said velocity multiplier arrangements, said connecting rods having corresponding actuating ends carrying therebetween a collar encircling said two floating sleeves and coupled thereto in a manner to permit relative rotation of said sleeves with respect to said collar but to transmit movement therebetween in the direction of their axes.

7. Hydrokinetic energy converter according to claim 6 in which said collar is a double collar similar to a FIG. 8 so as completely to encircle each of said sleeves.

8. Velocity multiplier comprising a rotary input drive means, first and second velocity multiplier arrangements, each said arrangement comprising:
   (a) a straight toothed gear in driven relationship with said rotary input drive means;
   (b) a helical toothed gear coaxial with said straight toothed gear and having driven output means;
   (c) a reciprocating floating sleeve surrounding said gears provided with at least one internal projection mating with a tooth space of said straight toothed gear and at least one other internal projection mating with a tooth space of said helical toothed gear, whereby reciprocation of said floating sleeve in a first direction drivingly rotates said helical toothed gear with respect to said straight toothed gear; and,
   (d) free wheel means for eliminating any driving relationship between said input drive means and said straight tooth gear during reciprocation of said floating sleeve in a second opposite direction, said free wheel means operating in opposite directions for the two said velocity multiplier arrangements; and,
   transmission means between said rotary input drive means and said floating sleeve, said transmission means converting rotary movement of said input drive means to linear reciprocation of said floating sleeve.

9. Velocity multiplier according to claim 8, in which said input drive means comprises a pair of identical meshed gears each associated with a respective one of said velocity multiplier arrangements and in which each said free wheel means is arranged between corresponding ones of said meshed gears and said straight toothed gears.

10. Velocity multiplier according to claim 9, in which said transmission means comprises a gear crown including a differential gear set arranged between one of said identical meshed gears and a connecting rod arrangement connected to reciprocate said floating sleeves.

11. Velocity multiplier according to claim 10, in which said connecting rod arrangement comprises a pair of parallel connecting rods mounted on a shaft on either side of said velocity multiplier arrangements, said connecting rods having corresponding actuating ends carrying therebetween a collar encircling said two floating sleeves and coupled thereto in a manner to permit relative rotation of said sleeves with respect to said collar but to transmit movement therebetween in the direction of their axes.

12. Velocity multiplier according to claim 11 in which said collar is a double collar similar to a figure 8 so as completely to encircle each of said sleeves.

* * * * *